United States Patent                                      [11] 3,615,622

[72] Inventors Fumihiko Nishio;
              Nobuo Yamamoto, both of Ashigara-
              Kamigun, Kanagawa, Japan
[21] Appl. No. 572,696
[22] Filed     Aug. 16, 1966
[45] Patented  Oct. 26, 1971
[73] Assignee  Fuji Shashin Film Kabushiki Kaisha
               Kanagawa, Japan
[32] Priority  Aug. 16, 1965
[33]           Japan
[31]           40/49824

[54] HARDENING GELATIN WITH POLYMERIC-
     BISULFITE ADDITION PRODUCT
     8 Claims, No Drawings
[52] U.S. Cl. .................................................. 96/111,
                                           106/125, 260/117
[51] Int. Cl. ......................................... G03c 1/30
[50] Field of Search ................................ 96/111;
                                           106/125; 260/117

[56]                References Cited
              UNITED STATES PATENTS
2,646,421  7/1953  Allen et al. ................... 96/100 X
3,103,437  9/1963  Henn et al. ................... 96/111
3,220,864  11/1965 Kenyon et al. ................. 96/111 X
3,442,655  5/1969  Blank .......................... 96/111

Primary Examiner—Norman G. Torchin
Assistant Examiner—Richard E. Fichter
Attorney—Semmes & Semmes ABSTRACT: A process for hardening gelatin by treating gelatin with a homopolymer of bisulfite addition product of vinyl isocyanate, a copolymer of bisulfite addition product of vinyl isocyanate and vinyl compound, a homopolymer of bisulfite addition product of isopropenyl isocyanate or a copolymer of bisulfite addition product of isopropenyl isocyanate and vinyl compound.

HARDENING GELATIN WITH POLYMERIC-BISULFITE ADDITION PRODUCT

The present invention relates generally to a process for hardening gelatin.

Photographic light-sensitive elements usually contain gelatin as their constituting elements, in silver halide photographic emulsion layers, protective coatings, substratum layers for film base, antihalation layers, backing layers and the like. The light-sensitive element containing gelatin is, after exposure, processed successively in aqueous solutions having different pH values and temperatures, for example; is subjected to development, stopping, fixing, and water rinsing. In this case, however, since the layer containing gelatin is weak in water resistance, the layer tends to be swelled excessively or scratched easily in the aqueous solution and further will be dissolved off if the temperature of the processing solution is high.

It has hitherto been confirmed that various compounds are effective for increasing the water resistance of gelatin layer. As an example is an inorganic compound such as chrome alum and an organic compound such as an aldehyde compound, an active vinyl compound, or an ethyleneimine compound, and it is well known that they are used as a hardening agent in the production of light-sensitive elements. However, almost all of these known hardening agents have undesirable influences on the photographic properties of photographic light-sensitive element (e.g., an increase in fog and a loss of photographic sensitivity), the hardening agent itself is chemically unstable, the solubility of the hardening agent into water is low, which makes the use thereof inconvenient, and the hardening agent losses their hardening effect when used in the presence of other photographic additives, such as, stabilizers, and color-forming couplers.

Besides these drawbacks, since almost all of the known hardening agents are low molecular compounds, they cannot be employed in the case of selectively hardening a specific gelatin-containing layer among the layers of a light-sensitive element to increase particularly the water resistance of the layer as compared with other layers or, on the contrary, weakening the hardening extent of a specific layer as compared with other layers to increase the swelling property of the layer. That is, low-molecular harding agents tend to be freely diffused from the layer in which the hardening agent has been incorporated during the drying procedure of the emulsion-coated film, which results in providing undesirable hardening action to the layer into which the hardening agent is not added.

Therefore, an object of the present invention is to provide a process for hardening gelatin using an improved hardening agent.

Another object of the present invention is to provide an improved hardening agent for gelatin.

A further object of the present invention is to increase the water resistance of gelatin-containing layers or gelatin moldings.

Still another object of the present invention is to provide a photographic light-sensitive element having gelatin layers, the water resistance of which has been improved by using an improved hardening agent for gelatin.

Other objects and advantages of the present invention will become apparent from the foregoing specification.

In accordance with the present invention, the water resistance of a gelatin-containing coating layer, or a gelatin-containing molding, can be increased by hardening gelatin by adding in a gelatin solution a homopolymer of the bisulfite-addition product of vinyl isocyanate or isopropenyl isocyanate represented by the general formula

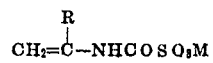

wherein R represents hydrogen (the bisulfite addition product of vinyl isocyanate) or $CH_3$ (the bisulfite addition product of isopropenyl isocyanate and M represents $NH_4$ or an alkali metal, such as Na or K, or a copolymer of the bisulfite addition product of vinylisocyanate or isopropenyl isocyanate shown by the above general formula with one of the following vinyl compounds;

1. Unsaturated acids and the alkali metal salts thereof:
   For example, acrylic acid, methacrylic acid, maleic anhydride, itaconic acid, p-vinylbenzoic acid, p-vinylbenzene sulfonic acid, vinyl sulfonic acid and the alkali metal slats thereof such as the sodium salts and potassium salts,
2. Acrylic acid esters:
   For example, methyl acrylate, ethyl acrylate, propyl acrylate, butyl acrylate, 2-ethylhexyl acrylate and the like,
3. Methacrylic acid esters:
   For example, methyl methacrylate, ethyl methacrylate, propyl methacrylate, butyl methacrylate, 2-ethylhexyl methacrylate and the like,
4. Acrylamides: For example, acrylamide, N-methylacrylamide, N-ethylacrylamide, N-propylacrylamide, N-butylacrylamide, N-methylolacrylamide, N-methoxymethylacrylamide, N-2-methoxyethylacrylamide, N, N-dimethylacrylamide, N, N-diethylacrylamide, N-acryloyl morpholine, N-morpholinomethylacrylamide and the like,
5. Methacrylamides:
   For example, methacrylamide, N-methylmethacrylamide, N-ethylmethacrylamide, N-propylmethacrylamide, N-butylmethacrylamide, N, N-diethylmethacrylamide, N-methacryloyl morpholine, N-norpholino methyl methacrylamide and the like,
6. Vinyl esters:
   For example, vinyl formate, vinyl acetate, vinyl propionate, vinyl butyrate, vinyl benzoate and the like; and
7. Others:
   Vinyl imidazole and the derivatives thereof, vinyl pyrrolidone and the derivatives thereof, vinylpyridine and the derivative thereof, styrene and the derivatives thereof, unsaturated halides such as vinyl chloride and vinylidene chloride, and vinyl ether.

The above-mentioned hardening agents have a compatibility with gelatin in a wide range, and when they are incorporated in gelatino silver halide photographic emulsions they exhibit good hardening action without bad effects on the photographic properties (sensitivity, gradation, preservability, fog and the like) of the photographic emulsions. Further, the above-mentioned hardening agents are stable in isolated states and in solution states thereof and they will not lose their hardening effects when they are stored for a long period of time.

The above-mentioned hardening agents may be used not only for photographic light-sensitive elements but also for color filters, gelatin-containing layers for baryta-treated papers, and gelatin-containing moldings such as gelatin capsules.

The polymer or copolymer obtained from the bisulfite addition product of vinyl isocranate or the bisulfite addition product or isopropenyl isocyanate which is used in the present invention is a high molecular hardening agent and hence different from conventional low molecular hardening agents. When it is incorporated in a specific gelatin layer of a light-sensitive element, it is not transferred into other layers by diffusion during the drying step of the emulsion coated films. This is very favorable for the improvement of the photographic properties, sensitivity for example, in the case where the photographic properties of multilayer type gelatino silver halide light-sensitive elements, in particular, the speed of development for gelatin silver halide emulsions is influenced by the physical properties of the emulsion layers.

That is, when a small amount of the high molecular hardening agent of the present invention or a small amount of other suitable hardening agent (e.g., a generally employed low molecular hardening agent) is incorporated in the emulsion layers of a multilayer type gelatin silver halide light-sensitive element and at the same time a comparatively large amount of the hardening agent of the present invention is incorporated in the protective layers of the light-sensitive element, the extent of the hardness and the mechanical properties of the layers of the light-sensitive element obtained after drying the coated film shows variation corresponding to the amounts of the hardening agents added. Therefore, although in this case the emulsion layers have been suitably hardened such that they can endure conventional photographic processings, the development will be carried out smoothly since the developing solution can be diffused and permeated into the emulsion layers comparatively freely. On the other hand, since the protective layer has an excellent water resistance and wear resistance, the occurrence of stick between light-sensitive elements when they are treated under a high humidity or stored under a high humidity can be completely prevented and further the light-sensitive element will not be scratched when treated under severe conditions such as a high temperature and a high pH.

The hardening agents of the present invention may be prepared by any methods but usually are prepared by the following four methods:

1. The vinyl isocyanate and isopropenyl isocyanate shown by the general formula

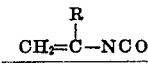

(wherein R is hydrogen or $CH_3$) (the compound may be prepared by the method, e.g., described in "Bulletin Societe Chimie Belge;" Vol. 65, Pages 291-296) is reacted with the bisulfite shown by the general formula $MHSO_3$ (wherein M is $NH_4$ or an alkali metal such as N or K) to form a bisulfite addition product of vinyl isocyanate or bisulfite addition product of isopropenyl isocyanate, and then by polymerizing thus prepared addition product by using a redox polymerization catalyst such as ammonium persulfate-acid sodium sulfite (Makromolecular Chemistry, Vol. 65, pages 291-296), each homopolymer is prepared.

2. The vinyl isocyanate or isopropenyl isocyanate used in the method 1-) is polymerized in a suitable starting agent (such as, benzoyl peroxide) or by the irradiation of ultraviolet rays and then the polymer is reacted with the bisulfite $MHSO_3$ shown in method (1) to provide the water soluble homopolymer.

3. The bisulfite addition product of vinyl isocyanate or the bisulfite addition product of isopropenyl isocyanate as prepared in method (1) is copolymerized with the aforementioned vinyl compounds using a suitable polymerization initiator (for example, a redox catalyst such as potassium persulfate-ascorbic acid or a conventional radical polymerization initiator such as azobis-isobutylonitrile or benzoyl peroxide) to provide various copolymers.

4. The vinyl isocyanate or isopropenyl isocyanate used in methods (1) and (2) is copolymerized with the aforementioned vinyl compounds using a suitable polymerization initiator e.g., benzoyl peroxide) or by the irradiation of ultraviolet rays and then thus obtained copolymers are reacted with the bisulfite $MHSO_3$ as used in method (1) and (2) to provide the water-soluble copolymers.

Any polymers and copolymers prepared by the above-mentioned methods may be used in this invention. In the case of preparing the copolymers as the hardening agent by the above-mentioned methods (3) or (4), the copolymerizing monomer ratio of the monomer containing the isocyanate or the bisulfite addition product of the isocyanate to the vinyl monomer, pH; polymerization temperature; reaction time; the concentration of monomer for regulating the polymerization degree, the kind and amount of polymerization regulators, and the like may be varied desirably. For example, since the monomer ratio of the above-mentioned copolymer gives some influences on the hydrophilic property of the thus obtained hardening agent, the compatibility thereof with gelatin and the hardening reactivity thereof, if it is necessary to add a comparatively large amount of the hardening agent to gelatin, in the case of selecting, for example, the copolymerizing monomer as the water-insoluble monomer among the above-mentioned vinyl compounds, the ratio of the monomer containing the bisulfite addition product of isocyanate to the water-insoluble vinyl monomer may be increased. On the other hand, if the amount of the hardening agent may be comparatively small as compared with that of gelatin, in the case of selecting as the copolymerizing monomer a water-soluble monomer such as an unsaturated acid or the alkali metal salts thereof, or acrylamides among the above-mentioned vinyl compounds, the ratio of the monomer containing the bisulfite addition product of the isocyanate to the water-soluble vinyl monomer may be reduced to such extent that the hardening power of thus prepared copolymer is not reduced. That is, as shown in the following examples, the copolymer having a good hydrophilic property and a good compatibility with gelatin may be prepared when the ratio of the bisulfite addition product of the isocyanate to the copolymerizing vinyl monomer if from 0.5/9.5 to 9.5/0.5, in particular from 5.0/5.0 to 9.5/0.5 if the water-insoluble vinyl compound is used as the copolymerizing monomer, and from 1.0/9.0 to 5.0/5.0 if the copolymerizing monomer is the water-soluble vinyl compound.

Moreover, since it is sometimes undesirable in the solubility of the hardening agent, the compatibility thereof with gelatin, the hardening power, and the diffusibility thereof into other layers that the hardening agent has an extremely high polymerization degree or an extremely low polymerization degree, as shown below, the hardening agent having the intrinsic viscosity ($\eta$) of 0.05–4.0 particularly 0.1–2.0 (measured at a temperature of 30°–35° C. in the solution as shown in below examples) is suitable.

However, it should be understood that the hardening agent of the present invention is not limited to the monomer ratio polymerization degree and the like may be varied desirably in accordance with the purposes.

The following are typical examples of the preparation of the hardening agents used in this invention:

Synthesis of the sodium bisulfite addition product of polyvinyl isocyanate (homopolymer I):

Into 35 ml. of water was dissolved 17.3 g. of the bisulfite addition product of vinyl isocyanate which had been prepared from vinyl isocyanate and acid sodium sulfite, and after the addition of 10 ml. of an aqueous 1 percent ammonium persulfate solution and 5 ml. of an aqueous 1 percent acid sodium sulfite solution, the resulting solution was stirred for 5 hours at 20°–22° C. Thereafter, the reaction mixture was poured in 300 ml. of methanol and thus formed precipitates were recovered by filtration, washed with methanol, and then subjected to a dialysis for 20 hours using a cellophane tube. The product was then subjected to freeze-drying to provide 1.2 g. of a white powdered polymer. The intrinsic viscosity of the polymer was 0.15 (in an aqueous 1 percent sodium chloride solution at 35° C.).

Synthesis of the ammonium bisulfite addition product of polyisopropenyl isocyanate (homopolymer II):

By the process as in the case of preparing homopolymer I, 10.5 g. of a white powdered polymer was obtained using 16.8 g. of the ammonium bisulfite addition product of isopropenyl isocyanate which had been prepared from isopropenyl isocyanate and acid ammonium sulfite.

The intrinsic viscosity of the polymer is an aqueous 0.5 N ammonium sulfate solution at 35° C. was 0.12.

Preparation of a copolymer of the potassium bisulfite of isopropenyl isocyanate and methacrylic acid (monomer ratio 3/7) (copolymer I):

Into 178 parts by weight of water were dissolved 22.4 g. of the potassium bisulfite addition product of isopropenyl isocyanate which had been prepared from isopropenyl isocyanate and acid potassium sulfite and 24.3 g. of methacylic acid and after the addition of 0.22 g. of potassium persulfate and 0.22 g. of L-ascorbic acid, the resulting solution was stirred for 6 hours at 40° C. The reaction product was dialyzed for 24 hours in water stream and then dried by freeze-drying to provide 18 g. of a white powdered copolymer. The intrinsic viscosity of the copolymer in an aqueous 0.5 N potassium sulfate solution at 35° C. was 0.91.

Preparation of a copolymer of the sodium bisulfite addition product of vinyl isocyanate and methylmethacrylate (monomer ratio 5:5) (copolymer II):

Into 82 g. of water mixed 31.5 g. of the acid sodium sulfite addition product of vinyl isocyanate and 20 g. of methylmethacrylate and after the addition of 0.5 g. of ammonium persulfate, 0.1 g. of acid sodium sulfite and 0.5 g. of sodium lauryl sulfate, the system was stirred for 3 hours at room temperature. The reaction mixture was poured in methanol to form precipitates which were recovered by filtration, washed with methanol and dried to provide 35 g. of a copolymer. The intrinsic viscosity of the copolymer (in an aqueous 1 percent sodium chloride solution at 35° C.) which was dialyzed in water stream followed by drying was 1.2.

Preparation of a copolymer of the sodium bisulfite addition product of vinyl isocyanate and acrylamide (monomer ratio 3:7) (copolymer III):

Into 165 ml. of water were dissolved 14.1 g. of the sodium bisulfite addition product of vinyl isocyanate and 14.9 of acrylamide and after the addition of 0.15 g. of potassium peroxide and 0.15 g. of L-ascorbic acid, the resulting solution was stirred for 2 hours at 30° C. The reaction mixture was dialyzed for 40 hours in water stream using a cellophane film and dried by freeze-drying to provide 17.4 g. of a white powdered copolymer. The intrinsic viscosity of the copolymer was 0.29 (in an aqueous 1 percent sodium chloride solution at 35° C.).

Preparation of a copolymer of the acid sodium sulfite addition product of vinyl isocyanate and acryloyl morpholine (monomer 2:8) (copolymer IV):

The same procedure as in the case of preparing copolymer III except that the reaction temperature was 40° C. and reaction time was 3 hours was repeated using 7.9 g. of the sodium bisulfite addition product of vinyl isocyanate and 27.8 g. of acryloyl morpholine to provide 23 g. of copolymer. The intrinsic viscosity of the copolymer in an aqueous 1 percent sodium chloride solution at 35° C. was 0.19.

Preparation of a copolymer of the sodium bisulfite addition product of vinyl isocyanate and N-morpholino methylacrylamide (monomer ratio 5:5) (copolymer v):

By repeating the procedure as in the case of preparing copolymer IV, 18 g. of a copolymer was obtained from 15.7 g. of the sodium bisulfite addition product of vinyl isocyanate and 16.8 of N-morpholine methyl-acrylamide. The intrinsic viscosity of the copolymer in an aqueous 1 sodium chloride solution at 35° C. was 0.23.

Preparation of a copolymer of the sodium bisulfite addition product of isopropenyl isocyanate and vinyl pyrrolidone (monomer ratio 4:6) (copolymer VI):

By repeating the same procedure as in the preparation of copolymer III, 47.3 g. of a copolymer was obtained from 34.2 g. of the sodium bisulfite addition product of isopropenyl isocyanate and 33.3 g. of N-vinyl pyrrolidone. The intrinsic viscosity of the copolymer in an aqueous 1 percent sodium chloride solution at 35° C. was 0.57.

There are no particular restrictions about the amount of the high molecular hardening agent to be used in this invention but about 0.1 to 30 percent by weight thereof to gelatin is usually suitable. If the content of the hardening agent is less than the range, the hardening effect becomes weak and if larger than this range, the compatibility thereof with gelatin becomes lower. The hardening agents of this invention may be used alone or a mixture thereof or a mixture with other hardening agents.

The invention will now be explained by the following examples bit it should be understood that the invention shall not be limited to the examples by any means.

EXAMPLE 1

Aqueous solution each containing 5 percent of homopolymer I, copolymer III or copolymer V as described above were prepared. Each of the aqueous copolymer solution was mixed with 100 ml. of an aqueous 10 percent gelatin solution in an amount of 1 ml., 2 ml., or 10 ml. The resulting mixture contained the copolymer in an amount of 0.5 percent, 1 percent or 5 percent to dried gelatin. After adjusting pH to 7, the mixture was applied to a film base of cellulose triacetate and dried. The melting point in water of the coated layer on the film after 7 days at room temperature is as follows:

| Hardening Agent | Amount of hardening agent to gelatin | | | |
|---|---|---|---|---|
| | 0% | 0.5% | 1.0% | 5.0% |
| Polymer I | 32° C. | 35° C. | 44° C. | above 90° C. |
| Copolymer III | 32° C. | 34° C. | 40° C. | 82° C. |
| Copolymer V | 32° C. | 41° C. | 80° C. | above 90° C. |

EXAMPLE 2

Different proportions of an aqueous solution containing 5 percent of homopolymer II, copolymer I or copolymer IV as described above, that is, 2 ml. 4 ml., or 10 ml. or the aqueous solution was mixed with 100 ml of an aqueous 10 percent gelatin solution. The resulting solution contained 1 percent 2 percent or 5 percent of the copolymer to dried gelatin. This mixture was applied on a glass plate followed by drying. The melting point of the coated layer on the glass plate in an aqueous 3 percent sodium carbonate solution after 10 days from coating is as follows:

| Hardening agent | Amount of hardening agent to gelatin | | | |
|---|---|---|---|---|
| | 0% | 1% | 2% | 5% |
| Polymer II | 32° C. | 75° C. | above 90° C. | above 90° C. |
| Copolymer I | 32° C. | 45° C. | 80° C. | above 90° C. |
| Copolymer IV | 32° C. | 43° C. | 76° C. | above 90° C. |

EXAMPLE 3

Into 1 kg. of photographic iodo-bromide emulsion containing 80 g. of gelatin was added 48 ml. of the aqueous solution containing 5 percent of homopolymer I, copolymer IV or copolymer V as used in example 1 or 2, and after adjusting the pH to 7.0, the mixture was applied on a glass plate and dried. The melting point of the coated layer on the plate in an aqueous 3 percent sodium carbonate solution and the photographic properties thereof are as follows:

| Hardening agent | Period after coating | | | Photographic property (after 7 days) | | |
|---|---|---|---|---|---|---|
| | 1 day | 7 days | 15 days | R.S.[1] | Gamma | Fog |
| Standard (control) | 32° C. | 32° C. | 33° C. | 100 | 0.92 | 0.06 |
| Polymer I | 40° C. | 72° C. | Above 90° C. | 93 | 0.89 | 0.06 |
| Copolymer IV | 38° C. | 60° C. | 85° C. | 95 | 0.90 | 0.04 |
| Copolymer V | 41° C. | 65° C. | Above 90° C. | 95 | 0.91 | 0.04 |

[1] Relative sensitivity.

EXAMPLE 4

Into 1 kg. of a silver chloro-bromide emulsion containing 65 g. of gelatin and 5 g. of polyethyleneimine was added 50 ml. of an aqueous solution containing 3 percent of copolymer II or copolymer VI as described above and the mixture was applied to a baryta paper and dried. The melting point of the coated layer of the printing paper in water is as follows:

| Hardening agent | Period after coating | | 50° C., 280% RH. |
| --- | --- | --- | --- |
|  | 4 days | 15 days | 3 days |
| Standard (control) | 32° C. | 32° C. | 34° C. |
| Copolymer II | 40° C. | 60° C. | 85° C. |
| Copolymer VI | 43° C. | 72° C. | above 90° C. |

EXAMPLE 5

Into 1 kg. of a color photographic silver iodo-bromide emulsion contain 80 g. of gelatin and 15 g. of the coupler having the following structure was mixed 16 ml. of an aqueous solution of 5 percent of copolymer II,

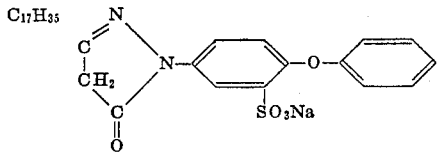

and after adjusting the pH thereof to 7.0, the mixture was applied on a film base of polyethylene terephthalate and dried. The melting point of the coated layer on the film in water is as follows:

| Hardening agent | Period after coating | | 50° C., 80% RH |
| --- | --- | --- | --- |
|  | 4 days | 15 days | 2 days |
| Standard (control) | 32° C. | 32° C. | 34° C. |
| Copolymer III | 60° C. | 85° C. | above 90° C. |

EXAMPLE 6

Into 1 kg. of a silver iodo-bromide emulsion containing 80 g. of gelatin was added 16 ml. of an aqueous containing 2 of copolymer V and after adjusting the pH to 7.0, the mixture was applied to a film base of cellulose triacetate. To the thus formed coating was further applied a mixture consisting of 50 ml. of an aqueous solution containing 2 percent of copolymer V and 1 liter of an aqueous 2 percent gelatin solution. The melting point in water of thus prepared photographic film having the protective layer reached 80° C. after 7 days. No troubles occurred when the photographic film stored for a long period and further no softening of the emulsion layer in processings such as development, fixing and water rinsing was observed. Moreover, even though the emulsion layer was hardened as above, no bad influences were observed on the photographic properties of the emulsion layer, such as, reduction in sensitivity, reduction in gradation, softening, formation of fog, and the like.

We claim:

1. A process for hardening a gelatin which comprises reacting the gelatin with a bisulfite addition product of a polymer selected from the group consisting of homopolymers of vinyl isocyanate, copolymers of vinyl isocyanate with another vinyl compound, homopolymers of isopropenyl isocyanate, and copolymers of isopropenyl isocyanate with another vinyl compound, said vinyl compound being selected from the group consisting of unsaturated acids, alkali metal salts of unsaturated acids, acrylic acid esters, methacrylic acid esters, acrylamides, methacrylamides, vinyl esters of carboxylic acids, vinyl imidazoles, vinyl pyrrolidones, vinyl pyridines, vinyl substituted benzene compounds, and unsaturated halides containing compounds. wherein R represents a member selected from the group consisting of hydrogen and $CH_3$ and M represents a member selected from the group consisting of $NH_4$ and alkali metals.

2. THe process as in claim 1, wherein said bisulfite addition product is represented by the general formula

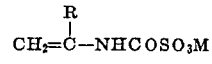

wherein R represents a member selected from the group consisting of hydrogen and $CH_3$ and M represents a member selected from the group consisting of $NH_4$ and alkali metals.

3. The process as in claim 1, wherein the proportion of said polymer is about 0.1–30 percent based on the weight of gelatin.

4. The process as in claim 1, wherein said gelatin is present as a layer of a photographic light-sensitive element.

5. The process as in claim 4, wherein said layer is a gelatino silver halide photographic emulsion layer.

6. The process as in claim 4, wherein said layer is a protective layer.

7. The process of claim 1, wherein said bisulfite addition product is formed prior to the polymerization of said polymer.

8. The process of claim 1, wherein said bisulfite addition product is formed after the polymerization of said polymer.

* * * * *